Patented July 20, 1943

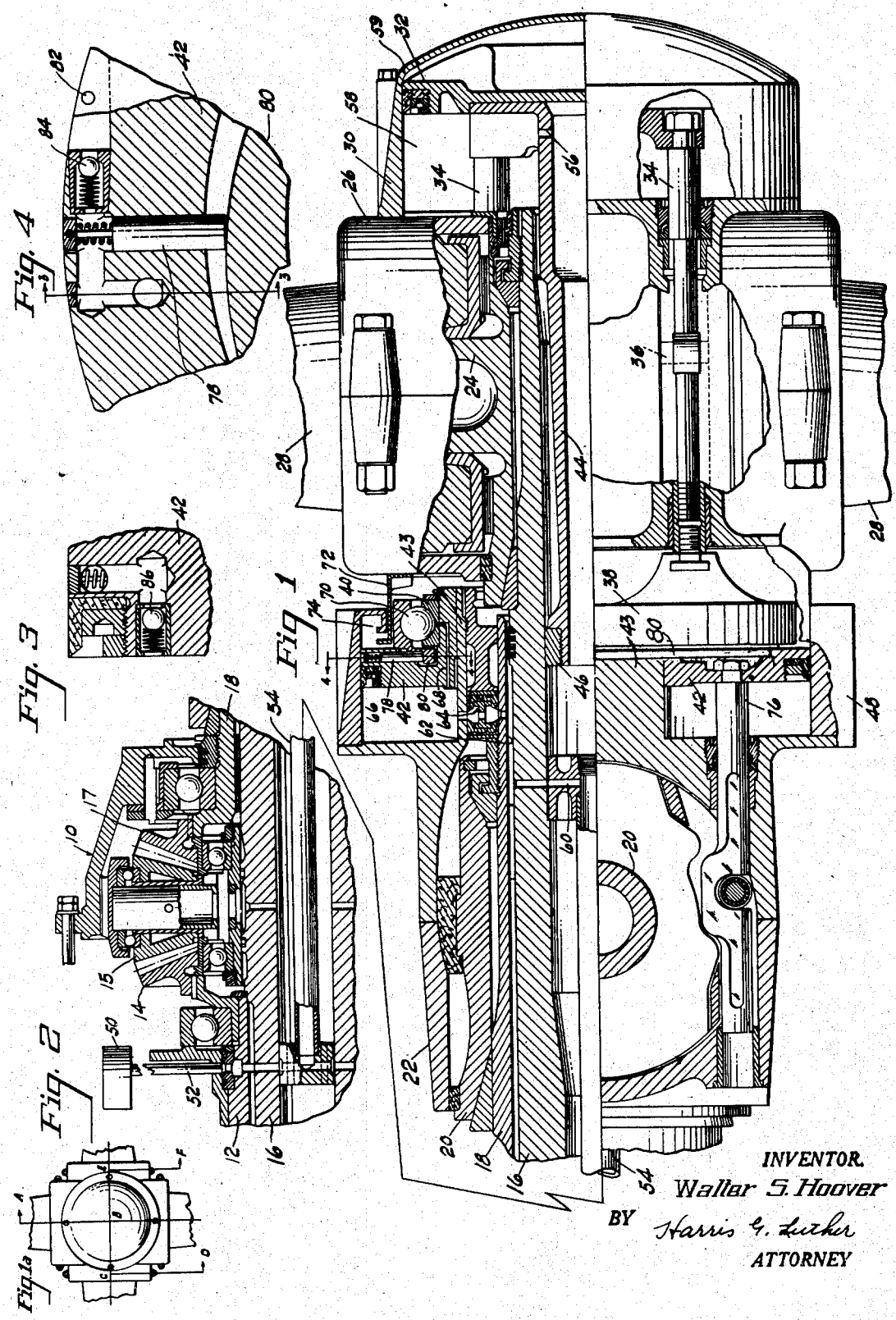

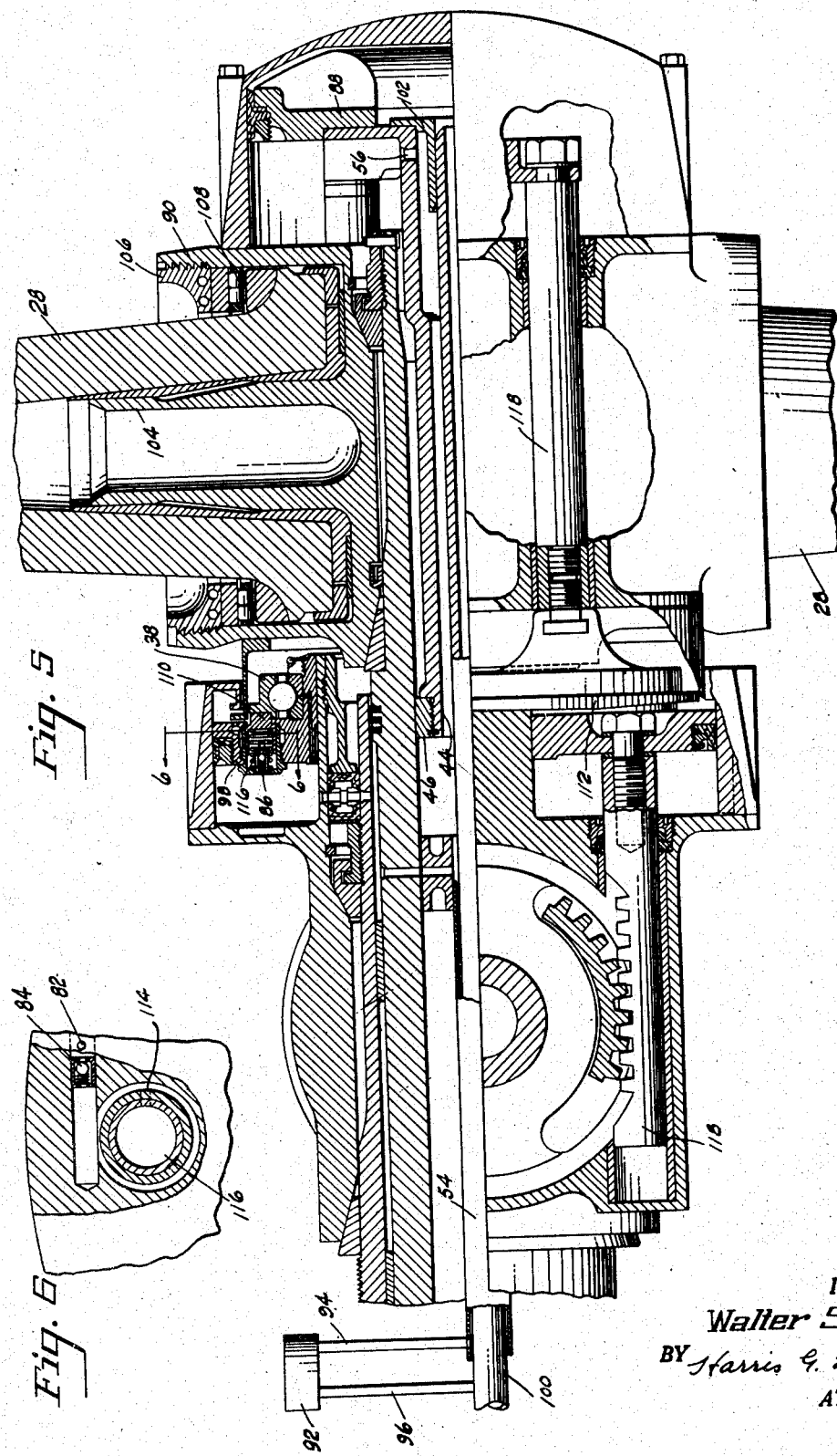

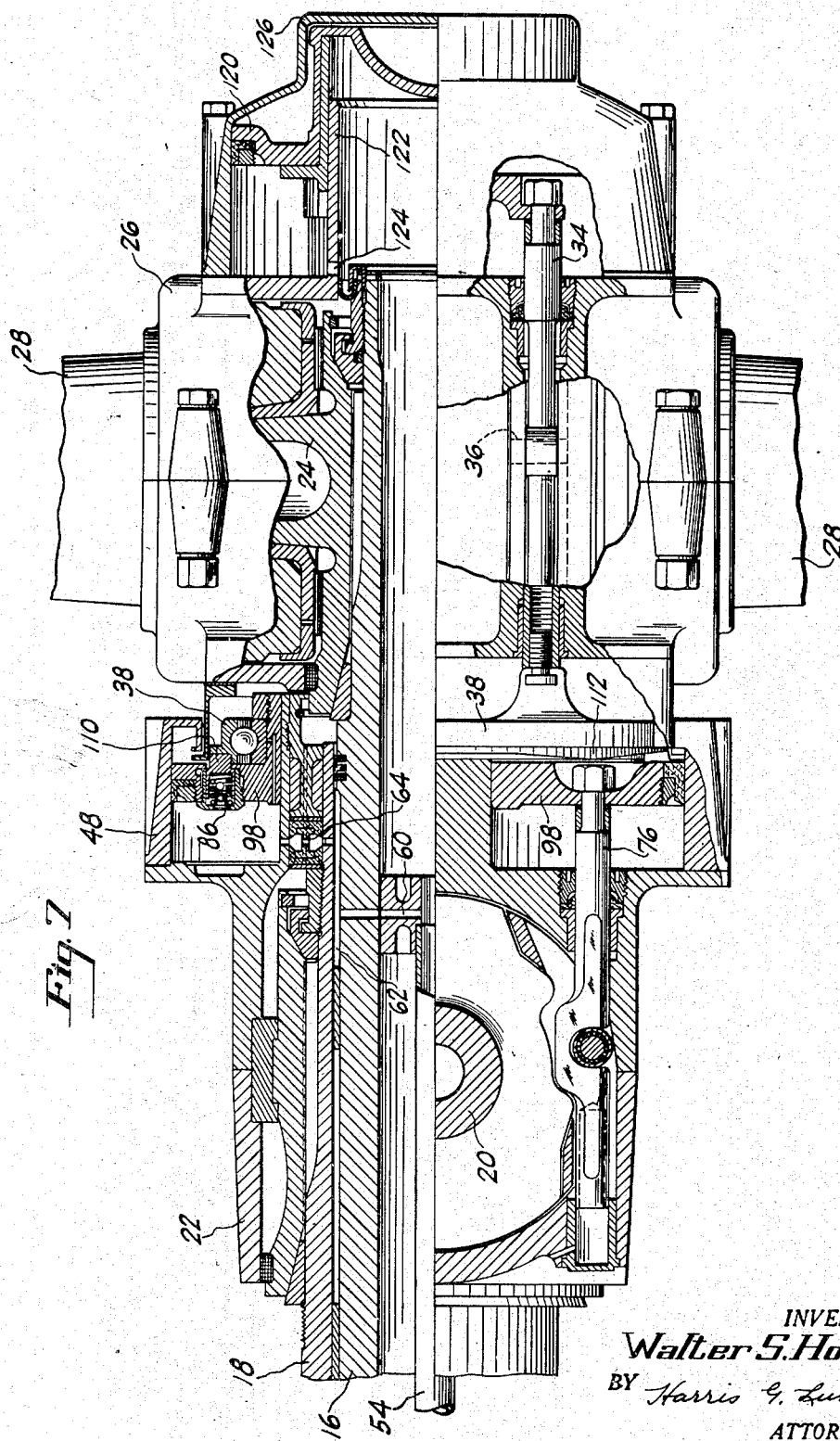

2,324,625

UNITED STATES PATENT OFFICE 2,324,625

TRANSFER BEARING

Walter S. Hoover, Montreal, Quebec, Canada

Original application June 13, 1939, Serial No. 278,859. Divided and this application December 10, 1940, Serial No. 369,459

6 Claims. (Cl. 308—187)

This invention relates to controllable pitch propellers and more particularly to bearings in the control mechanism thereof.

An object of this invention is to provide means for oiling a transfer bearing in the control mechanism.

Another object of this invention is to provide a self lubricating bearing.

Other and further objects will be apparent from the drawings and specification.

This application is a division of my United States Patent No. 2,318,939, issued May 11, 1943, for Propeller transfer bearing.

In the accompanying drawings in which like reference numerals are used to designate similar parts throughout, there is illustrated what is now considered to be the preferred form of the invention. The drawings, however, are for the purpose of illustration only and are not to be taken as limiting the invention.

Fig. 1a is a front view of two oppositely rotating controllable pitch propellers.

Fig. 1 is a section taken on lines A, B, C, and D for the front propeller and lines A, B, E, and F for the rear propeller.

Fig. 2 is a sectional view of the drive for the propellers of Fig. 1.

Fig. 3 is a section on lines 3—3 of Fig. 4.

Fig. 4 is a section on lines 4—4 of Fig. 1.

Fig. 5 is a sectional view of two concentric oppositely rotating propellers with a modified form of control.

Fig. 6 is a section on lines 6—6 through the scavenging pump.

Fig. 7 is a sectional view with portions shown in full elevation of a somewhat modified form of control of the propeller shown in Fig. 1.

Referring to the drawings in detail and particularly Figs. 1 and 2, an engine indicated generally at 10 drives a member 12 splined to bevel gear 14 and to propeller shaft 16. Bevel gear 14 meshes with a pinion gear 15 carried by a cage fixed to the engine 10. Pinion 15 drives bevel gear 17 splined to propeller shaft 18 which carries a propeller spider 20 and barrel 22 for supporting propeller blades at its outer end. Propeller shaft 16 passes through the interior of shaft 18 and carries a spider 24, a hub barrel 26 and propeller blades 28 at its outer end. The drive thus far explained will rotate the propellers in opposite directions.

A cylinder 30 is mounted on the barrel 26 at the forward portion thereof and a piston 32 is mounted to reciprocate in the cylinder. The piston carries a member 44 extending into the shaft 16 and having a bearing 46 at the inner end thereof contacting the inner surface of shaft 16 to help guide the piston in its travels into the cylinder 30. The piston also carries rods 34. Each rod is slotted intermediate its length and straddles a pin 36 carried by the propeller blade 28. Axial movement of the rod 34 will, therefore, cause pitch changing rotation of the blade 28. The rods 34 pass through the barrel 26 and at their rear end are fixed to the outer race 38 of a ball bearing. The inner race 40 of the ball bearing is carried by a piston 42 mounted to reciprocate in a cylinder 48 fixed to the forward portion of barrel 22. The piston 42 is guided by a member 43 integral with and projecting forward from the barrel 22. Oil from a governor 50 is led through a conduit 52 to the interior of shaft 16 and thence into the interior of a tube 54. This oil finds its way along the interior of the shaft 16 and the interior of the member 44 and passes through an orifice 56 in member 44 to the space 58 back of the piston 32. The forward side of the piston is vented by an orifice 59. This oil also passes through conduit 60 to the space 62 between the shafts 16 and 18. It then passes through the packed joint 64 to the space 66 back of piston 42. The governor 50 is of the type which connects the conduit 52 either with a source of pressure or with a drain. When the conduit 52 is connected with a source of pressure, the pistons 32 and 42 are forced to the right, as shown in Fig. 1, to move the pitch in one direction. When conduit 52 is connected with a drain centrifugal force acting on the propeller serves to change the blade pitch angle in the opposite direction and forces oil out of the spaces 58 and 66. Centrifugal force may be utilized to move the blades in either direction and hydraulic pressure used to oppose the centrifugal force. In the preferred embodiment, the blades are designed so that centrifugal force tends to reduce the blade pitch and hydraulic pressure is used to increase the blade pitch.

Means have been provided for lubricating the ball bearing carried by the piston 42. A conduit 68 leads from the space 66 through the inner race 40 to the ball 70 of the ball bearing. The excess oil is allowed to drain into the space between the two propellers. This oil is rotated by its contact with the rotating propellers and is thereby thrown outward by the action of centrifugal force. A member 72 secured to the rear portion of the barrel 26 collects this outwardly thrown oil and directs it into a space 74 at the forward portion of the cylinder 48. This oil is returned to the space 66 by means presently to be described.

The piston 42 is constrained to rotate with cylinder 48 and hub 22 by the rods 76 which connect that piston with the propeller blades carried by the hub 22. Piston 42 carries a plunger pump 78. The outer race 38 of the intermediate bearing carries an eccentric projection 80. This outer race 38 is constrained to rotate with the forward hub 26 by the rods 34 which pass through the hub and are connected to the race, thus the pump plunger 78 rotates in one direction and its actuating cam 80 rotates in the opposite direction which causes the plunger 78 to reciprocate in the piston 42. An orifice 82 leads from the space 74 through a check valve 84 into the pump chamber from where it is expelled past check valve 86 into the space 66 back of the piston.

Fig. 5 shows a construction generally similar to that described in Fig. 1 except that the forward piston 88 is double acting where the piston 32 of the device shown in Fig. 1 was single acting. The hub barrel 90 is a one-piece barrel where the barrel 26 of Fig. 1 was a split barrel. The scavenging pump for the center ball bearing is of different construction, and the drive to the propeller blades is a gear drive as distinguished from a pin and slot drive. It will, therefore, suffice to describe these differences without repeating the description of the general constructions. In the device shown in Fig. 5, a two-way pressure governor 92 is used which connects conduit 94 with pressure at the time conduit 96 is connected with drain and vice versa. Conduit 94 leads to interior of a tube 54 which connects with the rear side of pistons 88 and 98 in the manner indicated in the description of Fig. 1. Conduit 96 connects with a tube 100 placed inside of conduit 54. Conduit 100 leads directly to the front side of piston 88 and is supported at its forward end by a bearing 102 mounted on the piston 88. By introducing pressure onto the forward side of the piston 88, assistance is given to the centrifugal force in changing the blade pitch.

In the hub construction, the spider 104 is formed integral with the barrel 90 and the blade is retained on the spider and in the barrel by means of a retaining nut 106 against which the thrust bearing 108 acts.

The scavenging pump performs the same function in this device as it did in the device shown in Fig. 1, but consists of an axially reciprocable plunger 110 carried by the piston 98. The plunger is reciprocated by a cam 112 carried by the outer race 38 of the intermediate bearing. Oil is admitted to the plunger through an orifice 82 and is prevented from backing up by a check valve 84 in the manner described in connection with the device of Fig. 1. The pump outlet is controlled by check valve 86. Oil is admitted to the pump chamber through registering orifices 114 and 116 in the pump plunger and its cylinder wall.

The rods 118 which are connected to the pistons 88 and 98 and pass through the hub barrels for gear teeth cut thereon which mesh with gear teeth on the base of the propeller blades to change the blade pitch when the pistons are reciprocated.

The structure shown in Fig. 7 is generally similar to that shown in Fig. 1, but has a different scavenging pump, the scavenging pump being similar to that shown in Fig. 5. In the device shown in Fig. 5, however, the piston 120 at the forward end of the two propellers is guided on a projection 122 of the barrel 26 and oil is fed to the front face of the piston through an orifice 124 in that projection. The forward face of the piston is vented through a hole 126. Its construction, it will be noted, serves to keep oil under pressure out of the barrel 26 and thus avoids leakage and the necessity of packing that barrel.

The general structural features of the blade mountings and their connection with the propeller shafts are the usual and well known features quite generally employed in the propeller art.

By employing this double piston feature, that is, a piston for each propeller, the load on the intermediate bearing is greatly reduced and it is thus possible to maintain a predetermined pitch relation between the oppositely rotating propellers without having to transmit excessive loads through the intermediate bearing.

Although I have described a specific embodiment of the invention, it is to be understood that the invention is not limited to that specific embodiment, but any changes in modification may be made as come within the scope of the subjoined claims.

Having now described the invention so that others skilled in the art may clearly understand the same, what it is desired to secure by Letters Patent is as follows:

1. In combination with a bearing having an inner race and an outer race, means for rotating said races in opposite directions, means for supplying lubricant under pressure to said bearing, means rotating with one of said races and forming a chamber for collecting the lubricant that has passed through said bearing and has been thrown radially outward by centrifugal force, means rotating with the other race inside of said collecting means and radially outside of said bearing and directing said lubricant under the action of centrifugal force to said collecting means, a pump rotating with said one race for returning said lubricant to said supply, said pump having an intake port opening into, and adjacent the largest radius of, said chamber, and means associated with the other race for operating said pump.

2. In combination with a bearing arranged to rotate about a horizontal axis and having an inner race and an outer race, means for rotating the inner race with respect to the other including supports for said races, a pump positioned adjacent said bearing for circulating oil around said bearing, carried by the support for said inner race and rotating with said support and the inner race, and a cam for actuating said pump carried by the other race.

3. In combination with a bearing having an inner race and an outer race, means for rotating said races in opposite directions, mechanism for supplying lubricant to said bearing, means surrounding said bearing and rotating with the inner race for collecting lubricant that has passed through said bearing and is thrown outward by centrifugal force, said collecting means providing a rotating chamber for storing lubricant directed into and rotating with said collecting means, means rotating with the other race inside of said collecting means and outside of said bearing and directing said lubricant to said collecting means, a pump having a radially extending plunger associated with one of said races and having a suction port opening into the rotating chamber of said collecting means, and a cam connected with the other one of said races for actuating said pump.

4. In combination with a bearing having an inner race and an outer race rotatable in opposite directions, mechanism for supplying lubricant to said bearing, means surrounding said outer race for directing and collecting lubricant that has passed through said bearing, said means comprising a ring having an outturned flange surrounding, extending beyond one side of, and rotatable with the outer race of said bearing and a second ring having an inturned flange and providing a lubricant collector overlying said first mentioned ring, said second ring extending beyond the other side of said outer race and rotatable with said inner race, supports for said bearing, a pump carried by and rotatable with one of said supports and its associated race and having a plunger extending axially of said races, and having a suction port opening into the lubricant collector in the second ring portion of said means, and means associated with the other of said races for operating said pump.

5. In combination with a bearing having an inner race and an outer race, means for rotating said races in opposite directions, mechanism for supplying lubricant to said bearing, means surrounding said bearing and rotating with the inner race for collecting lubricant that has passed through said bearing and is thrown outward by centrifugal force, said collecting means providing a rotating chamber for storing lubricant directed into and rotating with said collecting means, means rotating with the other race inside of said collecting means and outside of said bearing and directing said lubricant to said collecting means, a pump having a plunger associated with one of said races and having a suction port opening into the rotating chamber of said collecting means and a cam connected with the other one of said races for actuating said pump.

6. In combination with a bearing having an inner race and an outer race rotatable in opposite directions, mechanism for supplying lubricant to said bearing, means surrounding said outer race for directing and collecting lubricant that has passed through said bearing, said means comprising a ring having an outturned flange surrounding, extending beyond one side of, and rotatable with the outer race of said bearing, and a second ring having an inturned flange and providing a lubricant collector overlying said first mentioned ring, said second ring extending beyond the other side of said other race and rotatable with said inner race, supports for said bearing, a pump carried by and rotatable with one of said supports and its associated race, and having a suction port opening into the lubricant collector in the second ring portion of said means, and means associated with the other of said races for operating said pump.

WALTER S. HOOVER.